United States Patent [19]
Chien

[11] Patent Number: 5,857,689
[45] Date of Patent: Jan. 12, 1999

[54] FRONT FORK HAVING A SUSPENSION SYSTEM DISPOSED THERETO

[75] Inventor: Percy Chien, Tu Chen, Taiwan

[73] Assignee: Fairly Bike Manufacturing Co. Ltd., Taipei Hsien, Taiwan

[21] Appl. No.: 838,889

[22] Filed: Apr. 14, 1997

[51] Int. Cl.⁶ ........................................................ B62K 1/00
[52] U.S. Cl. ............................................. 280/276; 267/202
[58] Field of Search .................................... 280/276, 279, 280/280; 267/195, 201, 202, 216, 286; 188/266, 322.19, 322.22, 378–380

[56] References Cited

U.S. PATENT DOCUMENTS 4,815,763  3/1989  Hartmann ................................ 280/276
5,702,092  12/1997  Farris ...................................... 280/276

*Primary Examiner*—Robert J. Oberleitner
*Assistant Examiner*—C. T. Bartz
*Attorney, Agent, or Firm*—Charles E. Baxley, Esq.

[57] ABSTRACT

A front fork having a suspension system disposed thereto includes an inner tube extending from a crown portion of the front fork, an outer tube slidably mounted to the inner tube, a ring member threadedly connected to the outer tube, a nut member threadedly connected to the inner tube and a spring mounted to the inner tube between the ring member and the nut member. The inner tube has a middle member and a first block respectively fixedly connected therein and the outer tube has a second block fixedly connected therein, a polygonal rod extending through a polygonal hole in the middle member and fixedly connected between the first block and the second block.

7 Claims, 6 Drawing Sheets

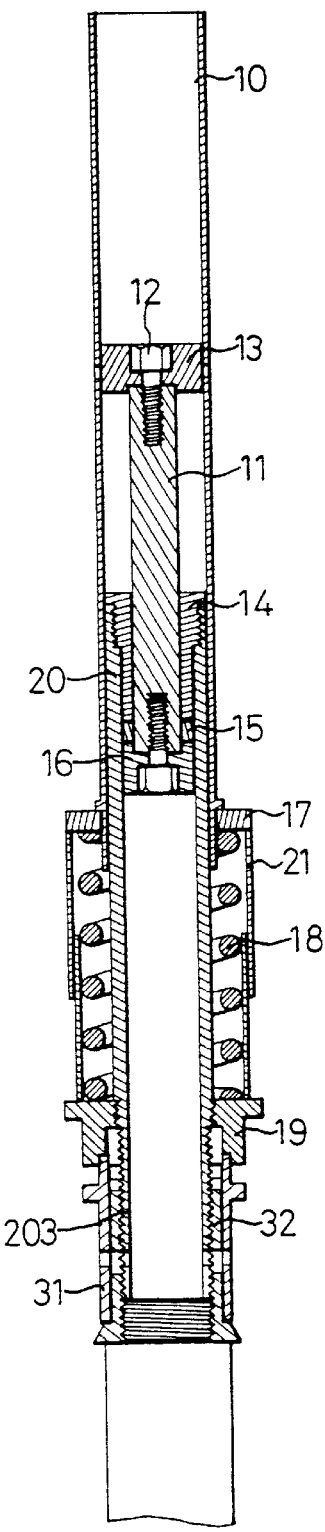
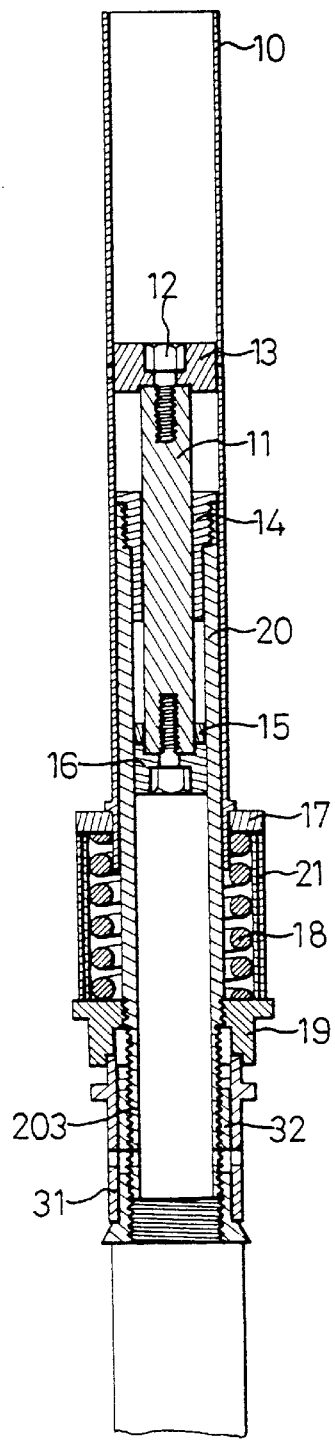
Fig 3
Fig 4

FRONT FORK HAVING A SUSPENSION SYSTEM DISPOSED THERETO

BACKGROUND OF THE INVENTION

1. Field of the Invention

The present invention relates to a front fork for a bicycle and, more particularly, to a front fork having a suspension system disposed thereto.

2. Brief Description of the Prior Art

A conventional suspension system disposed to a front fork of a bicycle known to Applicant is U.S. Pat. No. 5,449,155, entitled as "Suspension Shock Absorber For Bicycles" to Christoph Mack. The conventional suspension system designed for the front fork has a complicated structure. In the D.I.Y. or repairing market, some users want change their bicycles originally having no front suspension system into bicycles equipped with a front suspension system. However, they cannot afford a brand new and expensive front suspension system, and it is seldom to get a well developed replace parts to modify a conventional front fork into a front fork with a suspension system.

The present invention intends to provide an improved front fork having a suspension system so as to mitigate and/or obviate the above-mentioned problems.

SUMMARY OF THE INVENTION

The present invention provides a front fork having a suspension system disposed thereto and comprises a sleeve received in a crown portion of the front fork, an inner tube threadedly connected to the sleeve in the front fork, an outer tube slidably mounted to the inner tube with a spring disposed between the inner tube and the outer tube. A sleeve is inserted in a crown portion of the front fork and threadedly connected to the inner tube, the A first end of the inner tube has a second inner threaded portion and a first outer threaded portion defined in an outer periphery of the inner tube near the second end of the inner tube so that a nut member is threadedly engaged with the first outer threaded portion.

The outer tube has a first end and a second end from which a second flange extends radially therefrom, a second outer threaded portion defined in the second end of the outer tube below the second flange so as to threadedly engage with a ring member. The spring member is biasedly disposed between the ring member and the nut member.

It is an object of the present invention to provide a front suspension system which is easily to be disposed to a conventional front fork.

Other objects, advantages, and novel features of the invention will become more apparent from the following detailed description when taken in conjunction with the accompanying drawings.

BRIEF DESCRIPTION OF THE DRAWINGS

FIG. 3 is a side elevational view, partly in section, of the front fork having the suspension system when the suspension system is not operated;

FIG. 4 is a side elevational view, partly in section, of the front fork having the suspension system when the suspension system is operated;

DETAILED DESCRIPTION OF THE PREFERRED EMBODIMENTS

Figure 1:
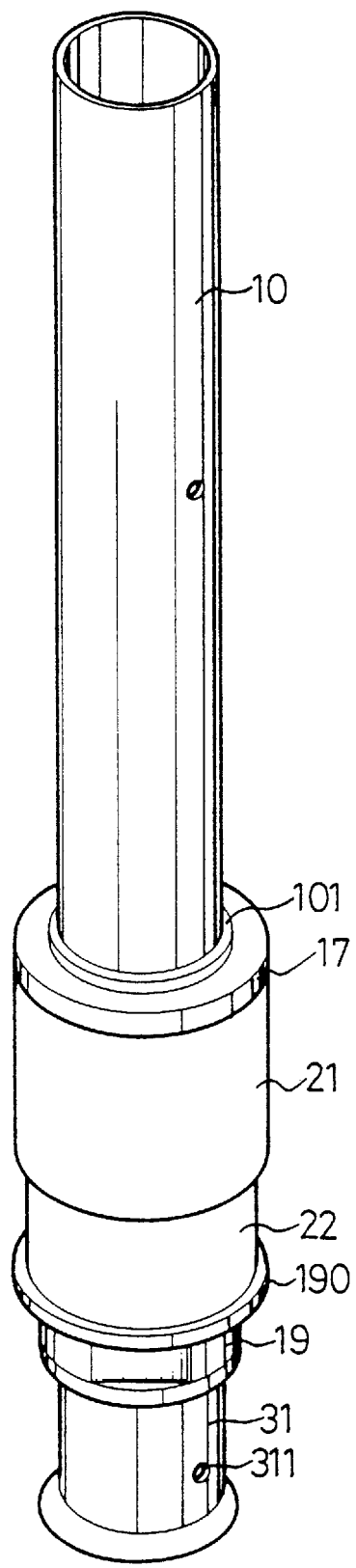
FIG. 1 is a perspective view of a front fork having a suspension system disposed thereto in accordance with the present invention.
Figure 2:
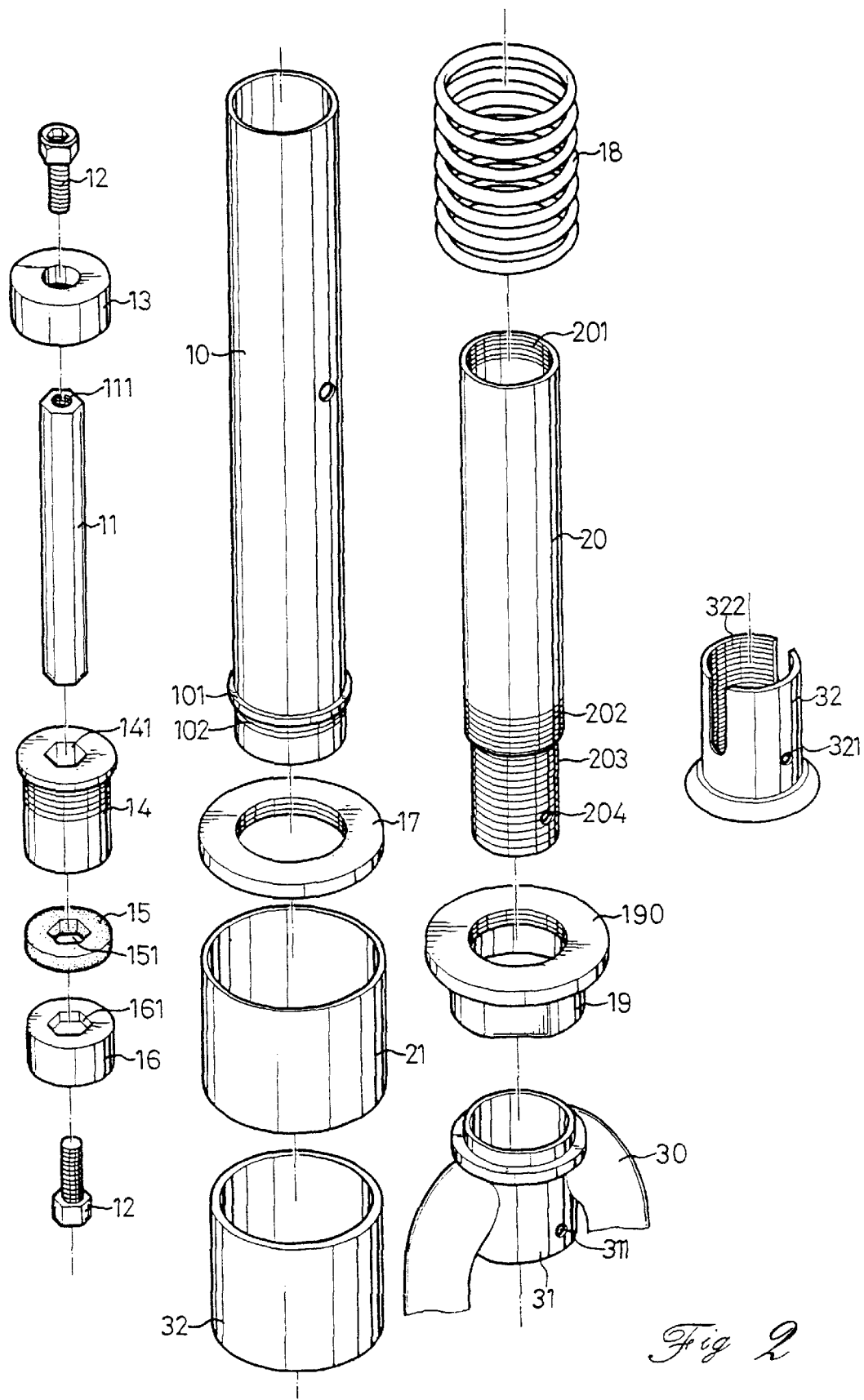
FIG. 2 is an exploded view of the front fork having the suspension system in accordance with the present invention.

Referring to the drawings and initially to FIGS. 1 through 3, a front fork having a suspension system disposed thereto in accordance with the present invention generally includes a sleeve 32 which is securely inserted into a crown portion 31 of the front fork 30 and has a first inner threaded portion 322 defined in an inner periphery thereof.

An inner tube 20 has a first end and a second end which has a threaded section 203 extending therefrom so as to threadedly connected to the sleeve 32 in the front fork 30. The first end of the inner tube 20 has a second inner threaded portion 201 defined in an inner periphery thereof, a first outer threaded portion 202 defined in an outer periphery of the inner tube 20 near the second end of the inner tube 20 so that a nut member 19 is threadedly engaged with the first outer threaded portion 202. The nut member 19 has a first flange 190 extending radially from a top thereof.

An outer tube 10 has a first end and a second end from which a second flange 101 extends radially therefrom, a second outer threaded portion 102 defined in the second end of the outer tube 10 below the second flange 101 so as to threadedly engage with a ring member 17. The first end of the inner tube 20 is slidably received in the outer tube 10.

Figure 5:
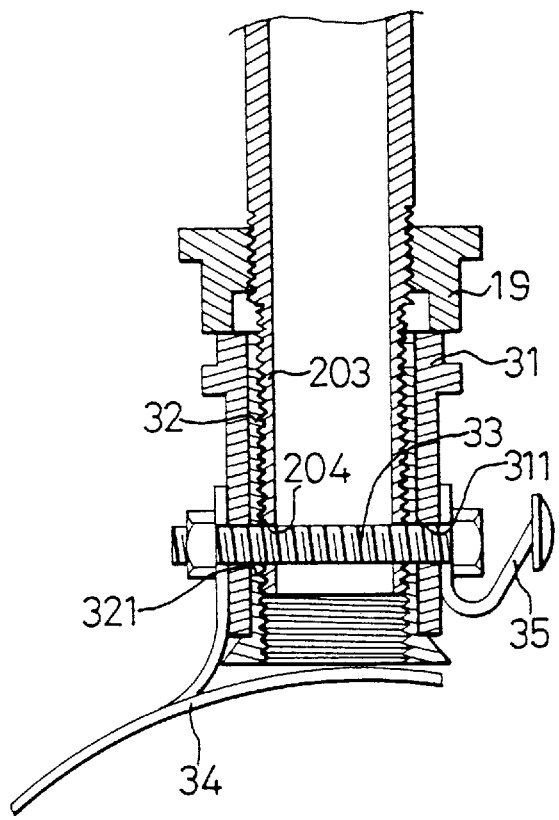
FIG. 5 is a side elevational view, partly in section, of the front fork having the suspension system wherein a bolt extends through the crown portion, the sleeve and the inner tube so as to dispose a reflector and a mudguard to the crown portion.

Further referring to FIG. 5, the crown portion 31, the sleeve 32 and the threaded section 203 respectively have a first hole 311, a second hole 321 and a third hole 204 defined therethrough for a bolt 33 extending therethrough. A reflector 35 and a mudguard 34 are therefore respectively disposed diametrically opposite to the crown portion 31 of the front fork 30 by the bolt 33.

A spring member 18 is mounted to the inner tube 20 and biasedly disposed between the ring member 17 and the nut member 19.

The inner tube 20 has a first block 16 fixedly fitted therein and a middle member 14 is threadedly engaged with the second inner threaded portion 201 with a washer 15 disposed between the middle member 14 and the first block 16 wherein the middle member 14, the washer 15 and the first block 16 respectively have a polygonal hole 141/151/161 defined therethrough. A second block 13 is fixedly fitted in the outer tube 10. A polygonal rod 11 extends through the polygonal holes 141/151/161 and fixedly connected between the first block 16 and the second block 13 by bolts 12 threadedly extending into the threaded holes 111 defined in both ends of the polygonal rod 11 via the first block 16 and the second block 13.

A dust cover including a first dust cover 21 and a second dust cover 22 is mounted to the spring 18 and connected between the ring member 17 and the nut member 19.

Referring to FIG. 4, when shocks are transmitted to the spring 18, the inner tube 20 together with the front fork 30 will move upwardly and the inner tube 20 extends toward the outer tube 10 to depress the spring 18 to absorb the shocks. Accordingly, the present invention can be easily disposed to a conventional front fork just by cutting the steerer tube (not shown) of the conventional front fork and inserting the sleeve 32 in the crown portion so that the suspension system of the present invention can be disposed to the conventional front fork.

Figure 6:
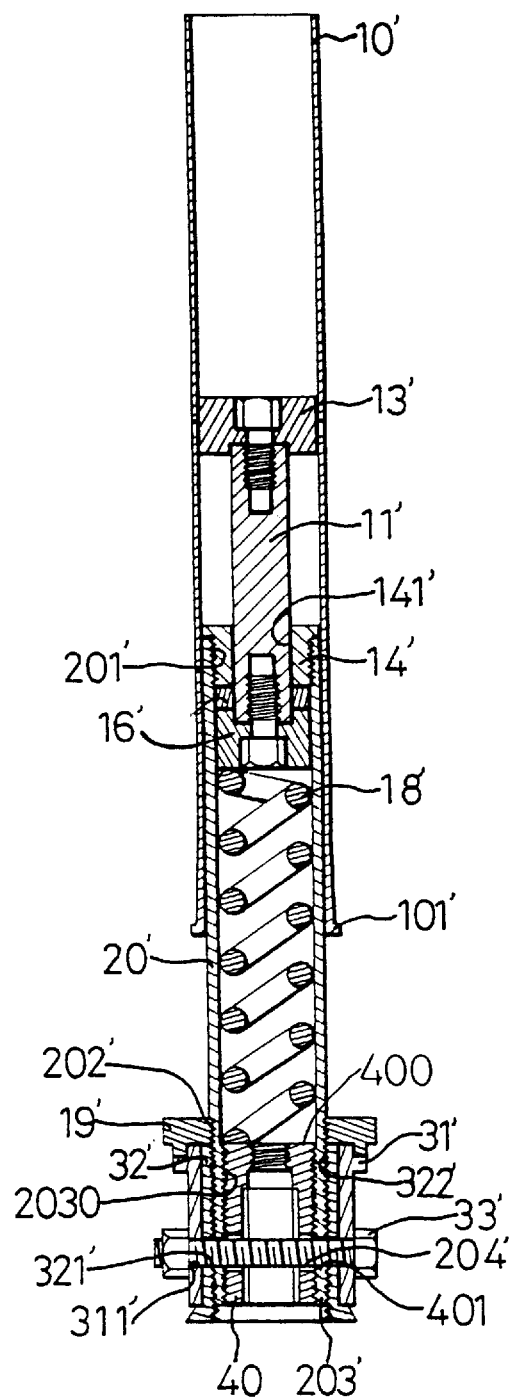
FIG. 6 is a side elevational view, partly in section, of another embodiment of the front fork having the suspension system when the suspension system is not operated.
Figure 7:
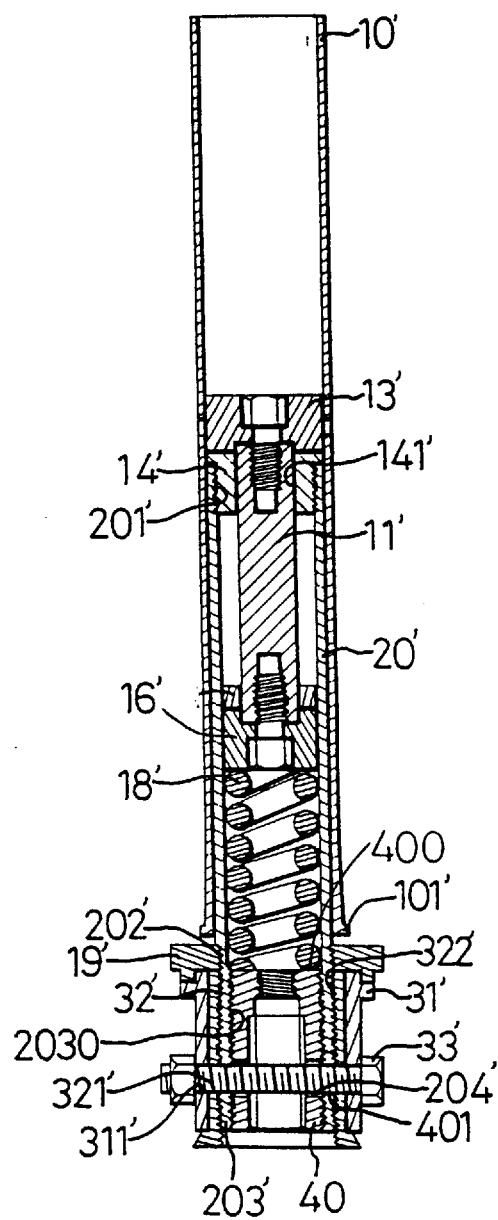
FIG. 7 is a side elevational view, partly in section, of the embodiment shown in FIG. 6 when the suspension system is not operated.

FIGS. 6 and 7 show another embodiment of the present invention, which includes a sleeve 32' which is securely inserted into a crown portion 31' of the front fork and has a first inner threaded portion 322' defined in an inner periphery thereof.

An inner tube 20' has a first end and a second end which extends from the front fork (not shown) and has a shoulder portion 400 extending inwardly and radially therefrom which will be described hereinafter. A threaded section 203' extends from the second end of the inner tube 20' so as to threadedly engage with the sleeve 32'. The threaded section 203' has a threaded inner periphery 2030' defined therein so that a short tube 40 is threadedly engaged with the threaded inner periphery 2030 and a top of the short tube 40 forms the shoulder portion 400. The first end of the inner tube 20' has a second inner threaded portion 201' defined in an inner periphery thereof and a first outer threaded portion 202' defined in an outer periphery thereof near the second end of the inner tube 20' so that a nut member 19' is threadedly engaged with the first outer threaded portion 202'.

An outer tube 10' has a first end and a second end from which a second flange 101' extends radially therefrom.

The first end of the inner tube 20' is slidably received in the outer tube 10'.

The inner tube 20' has a first block 16' fixedly fitted therein and a middle member 14' threadedly engaged with the second inner threaded portion 201' wherein the middle member 14' has a polygonal hole 141' defined therethrough. A second block 13' is fixedly fitted in the outer tube 10' and a polygonal rod 11' extending through the polygonal hole 141' and fixedly connected between the first block 16' and the second block 13' as the structure shown in FIGS. 1 through 4.

The crown portion 31', the sleeve 32', the threaded section 203' and the short tube 40 respectively have a first hole 311', a second hole 321', a third hole 204' and a fourth hole 401 defined therethrough for a bolt 33' extending therethrough.

A spring member 18' is biasedly disposed between the shoulder portion 400 and the first block 16' in the inner tube 20' so that when shocks are transmitted to the spring 18', the inner tube 20' together with the crown portion 31' will lift toward the outer tube 10' to depress the spring 18' to absorb the shocks.

Although the invention has been explained in relation to its preferred embodiment, it is to be understood that many other possible modifications and variations can be made without departing from the spirit and scope of the invention as hereinafter claimed.

What is claimed is:

1. A front fork having a suspension system disposed thereto, comprising:

a sleeve which is securely inserted into a crown portion of said front fork and has a first inner threaded portion defined in an inner periphery thereof, an inner tube having a first end and a second end which has a threaded section extending therefrom so as to threadedly connected to said sleeve in said front fork, said first end of said inner tube having a second inner threaded portion defined in an inner periphery thereof, a first outer threaded portion defined in an outer periphery of said inner tube near said second end of said inner tube so that a nut member is threadedly engaged with said first outer threaded portion;

an outer tube having a first end and a second end from which a flange extends radially therefrom, a second outer threaded portion defined in said end of said outer tube below said second flange so as to threadedly engage with a ring member, said first end of said inner tube slidably received in said outer tube;

a spring member biasedly disposed between said ring member and said nut member.

2. The front fork as claimed in claim 1, wherein said crown portion, said sleeve and said threaded section respectively have a first hole, a second hole and a third hole defined therethrough for a bolt extending therethrough.

3. The front fork as claimed in claim 1, wherein said inner tube has a first block fixedly fitted therein and a middle member is threadedly engaged with said second inner threaded portion wherein said middle member has a polygonal hole defined therethrough, a second block fixedly fitted in said outer tube, a polygonal rod extending through said polygonal hole and fixedly connected between said first block and said second block.

4. The front fork as claimed in claim 1, wherein a dust cover is mounted to said spring and connected between said ring member and said nut member.

5. A front fork having a suspension system disposed thereto, comprising:

an inner tube having a first end and a second end which extends from said front fork and has a shoulder portion extending inwardly and radially therefrom, said first end of said inner tube having a first inner threaded portion defined in an inner periphery thereof, a first outer threaded portion defined in an outer periphery of said inner tube near said second end of said inner tube so that a nut member is threadedly engaged with said first outer threaded portion;

an outer tube having a first end and a second end from which a flange extends radially therefrom, said first end of said inner tube slidably received in said outer tube;

said inner tube having a first block fixedly fitted therein and a middle member threadedly engaged with said first inner threaded portion wherein said middle member has a polygonal hole defined therethrough, a second block fixedly fitted in said outer tube, a polygonal rod extending through said polygonal hole and fixedly connected between said first block and said second block, and a spring member biasedly disposed between said shoulder portion and said first block in said inner tube.

6. The front fork as claimed in claim 5 further comprising a sleeve which is securely inserted into a crown portion of said front fork and has a second inner threaded portion defined in an inner periphery thereof, said inner tube having a threaded section extending from said second end thereof so as to threadedly engage with said sleeve, said threaded section having a threaded inner periphery defined therein so that a short tube is threadedly engaged with said threaded inner periphery and a top of said short tube forms said shoulder portion.

7. The front fork as claimed in claim 6, wherein said crown portion, said sleeve, said threaded section and said short tube respectively have a first hole, a second hole, a third hole and a fourth hole defined therethrough for a bolt extending therethrough.

* * * * *